United States Patent

[11] 3,610,612

[72] Inventor Clifford H. Day
P.O. Box 602, McLean, Tex. 79057
[21] Appl. No. 846,041
[22] Filed July 30, 1969
[45] Patented Oct. 5, 1971

[54] PICTURE-FRAMING CLAMP
6 Claims, 7 Drawing Figs.
[52] U.S. Cl. .................................................. 269/109, 269/130
[51] Int. Cl. ..................................................... B25b 5/02
[50] Field of Search ........................................ 269/108, 109, 281, 282, 283, 284, 285, 269, 259, 132, 104, 130, 131, 280; 242/97, 85, 96

[56] References Cited
UNITED STATES PATENTS
| 296,196 | 4/1884 | Lockwood | 242/96 |
| 508,732 | 11/1893 | Mason, Jr. | 269/264 |
| 3,224,754 | 12/1965 | Graham | 269/130 |

FOREIGN PATENTS
| 22,390 | 1895 | Great Britain | 269/108 |

Primary Examiner—Andrew R. Juhasz
Assistant Examiner—Z. R. Bilinsky
Attorney—Jacobi, Lilling and Siegel ABSTRACT: A novel clamp is disclosed for holding the sides of a picture frame or the like inserted therein in abutting relationship for assembly. The clamp, in a preferred embodiment thereof, comprises four right-angled corner blocks encircled by a flexible cord, the ends of which are wound upon a rotatable spool rigidly attached to one of the corner blocks so as to draw the corner blocks together and thus maintain the sides of the inserted frame mutually aligned and under compression. A locking pin cooperates with registry holes or recesses on the rotatable spool to prevent the spool from unwinding inadvertently while the cord is under tension.

The clamp further includes a pair of rods, each rod being secured to one of the corner blocks and slidably passing through an adjacent corner block to thus form two pairs of slidably interconnected blocks. In this fashion, the two slidably interconnected blocks of each pair are maintained in essentially constant orientation relative to each other, thus maintaining the clamp as a whole and the frame inserted therein in a rigid and stable configuration while under compression.

PATENTED OCT 5 1971

3,610,612

INVENTOR.
CLIFFORD H. DAY
BY Jacobi, Davidson &
Kleeman
ATTORNEYS 3,610,612

PICTURE-FRAMING CLAMP

BACKGROUND OF THE INVENTION

This invention relates to a device for clamping together work pieces for assembly, and specifically concerns a clamp for holding the four sides of a picture frame together in abutting, aligned relation while such sides are glued, nailed or otherwise secured together.

Picture frames or the like conventionally comprise four sides, each of which is mitred at its ends at a 45° angle, so that when two adjacent sides are abutted, a right angle will be formed and the overall frame will be rectangular. The assembly of such a frame by hand, and particularly holding of the sides together in an aligned condition, while nailing or cementing, is extremely arduous and oftentimes cannot be successfully achieved.

For this reason, jigs or clamps are known in the art for maintaining the four sides of the frame together in proper abutting relationship. Such prior art clamps typically are bulky and comprise two pairs of clamps, acting either between opposite sides of the frame or across the two diagonals of the frame, wherein each clamp of the pair must be set and tightened or loosened individually, which procedure is quite time-consuming. Further such known clamps are generally limited to small range of adjustment and can therefore only be used for a specific size of frame or a limited frame size range.

A further known framing clamp is operable to simultaneously clamp all four sides of a frame by means of a worm gear arrangement. However, clamps of this type are generally quite heavy and require a substantial supporting structure such as a machine table, and hence, are generally impracticable for smaller frames, particularly when produced on an individual or limited basis.

SUMMARY OF THE INVENTION

Thus, a need exists for a clamp assembly for picture frames and the like which effectively eliminate the aforementioned drawbacks of the prior art constructions. It is the primary object of the instant invention to satisfy this need.

Specifically, it is an object of the invention to provide a clamp for assembling a rectangular picture frame or the like, which clamp can easily and quickly secure all four sides of a picture frame together by a single operation.

It is a further object of the invention to provide such a clamp which is simple in construction and has few moving parts.

It is still a further object of the invention to provide such a clamp which is capable of operating over a wide range of adjustment and capable of clamping very large or very small frames with equal facility.

These, as well as other objects and advantages which will become apparent as the description proceeds, are implemented by the invention which comprises a novel clamp for holding the sides of a picture frame or the like inserted therein in abutting relationship for assembly. The clamp, in a preferred embodiment thereof, comprises four right-angled corner blocks encircled by a flexible cord, the ends of which are wound upon a rotatable spool rigidly attached to one of the corner blocks so as to draw the corner blocks together and thus maintain the sides of the inserted frame mutually aligned and under compression. A locking pin cooperates with registry holes or recesses on the rotatable spool to prevent the spool from unwinding inadvertently while the cord is under tension.

The clamp further includes a pair of rods, each rod being secured to one of the corner blocks and slidably passing through an adjacent corner block to thus form two pairs of slidably interconnected blocks. In this fashion, the two slidably interconnected blocks of each pair are maintained in essentially constant orientation relative to each other, thus maintaining the clamp as a whole and the frame inserted therein in a rigid and stable configuration while under compression.

BRIEF DESCRIPTION OF THE DRAWINGS

The invention itself will be better understood and further advantageous features thereof will become evident from the following detailed description of a preferred inventive embodiment, such description referring to the appended sheet of drawings, wherein.

DETAILED DESCRIPTION OF THE INVENTION

Figure 1:
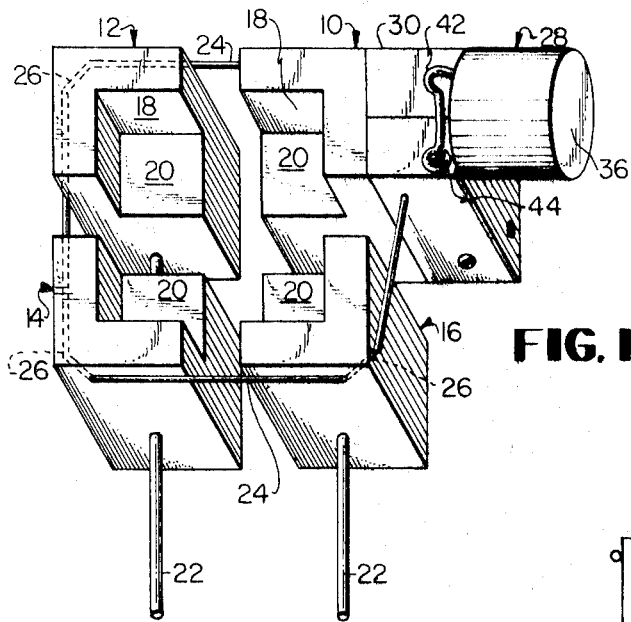
FIG. 1 is a perspective view of the clamp in its slackened or open position.
Figure 2:
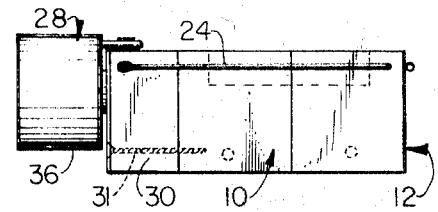
FIG. 2 is a rear elevational view of the clamp.

Referring now to the drawings, and particularly to FIG. 1 thereof, the inventive clamp will be seen to comprise four generally cubical cooperating corner blocks designated 10, 12, 14 and 16, respectively, constructed of wood or other suitable material. Each of these blocks is recessed at its upper inner corner as shown so as to define a square cornered depressed portion having vertical sidewalls 18 and a horizontal surface 20, all mutually perpendicular to each other. In this manner, the four corner blocks together define four corners of a rectangle which may be altered in size as will be more fully described hereinbelow.

Figure 3:
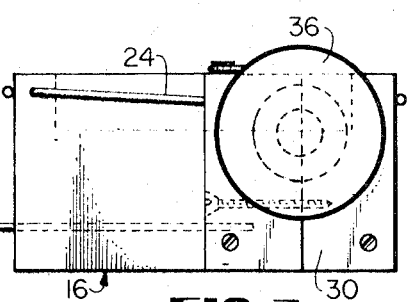
FIG. 3 is a right side elevational view.

An elongated guide rod 22 is rigidly embedded within and secured to each of the corner blocks 10 and 12, and is generally centered therein horizontally and extends outwardly in the direction of blocks 14 and 16, as best seen in FIGS. 1 and 3. While the vertical positioning of each of these rod 22 is not critical, best results are obtained by locating the axis of each rod 22 approximately midway between the horizontal surface 20 and the bottom of the respective block. Corner blocks 14 and 16 each have an elongated hole drilled therethrough to slidingly receive one of the rods 22, and the respective blocks are then slid onto the rods as shown in FIG. 1. It will be seen that in this manner two pairs of blocks are formed, one pair being associated with each of the guide rods 22, and one of the blocks of each pair being fixed relative to the rod and one being slideable relative to the rod, so that the blocks are slidable relative to each other along a defined path.

Figure 6:
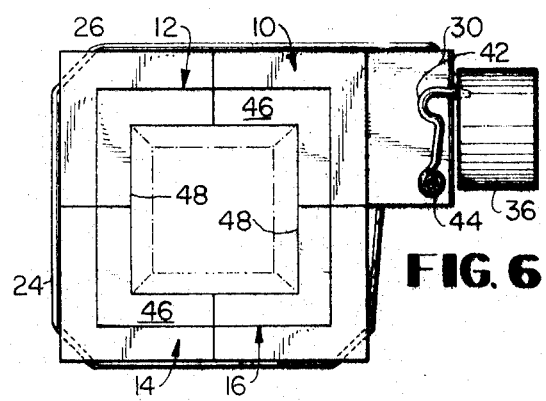
FIG. 6 is a top plan view of the clamp in its closed or tightened position showing spacer members inserted for clamping a small picture frame; and, FIG. 7 is an enlarged perspective view of a single corner block with a spacer member inserted therein.

Means are provided to draw the four corner blocks together simultaneously, such means preferably comprising a flexible cord 24 which passes about the periphery of the corner blocks, thus encircling the blocks. Each of the blocks 12, 14 and 16 has a short diagonal horizontal passageway 26 drilled between its two exterior faces adjacent the upper outer corner thereof, as best seen in FIGS. 1 and 6, the passageway being of a suitable cross section to permit the cord 24 to slide loosely therethrough. The passageways 26 are preferably all located at the same height and approximately midway between the top of each block and its horizontal surface 20.

Figure 5:
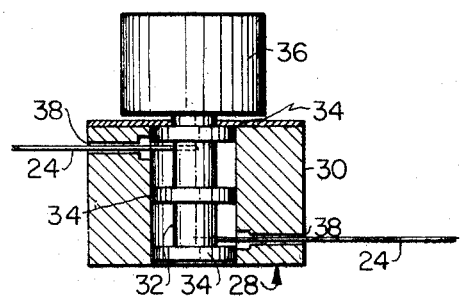
FIG. 5 is a horizontal section through the winding spool housing showing details of the spool.

Corner block 10 has secured thereto means for tightening the cord 24 so as to simultaneously draw all the corner blocks together. The tightening means preferably is in the form of a winding spool generally designated 28, and as best seen in FIG. 5, the spool comprises a housing 30 fastened by wood screws 31 or any other suitable securing means to the exterior of corner block 10, a winding shaft 32 rotatably journaled within housing 30 and upon which the cord 24 is wound. Shaft 32 has three axially spaced flanges 34 thereupon which divide the shaft into two separate winding sections for maintaining the ends of cord 24 separate from each other. Shaft 32 extends through the wall of housing 30 opposite corner block 10 and terminates in a hand operated turning means such as a winding cylinder 36 rigidly attached to the shaft. After the cord 24 has been passed around each of the corner blocks 12, 14 and 16 and threaded through the respective passageways 26 therein, the free ends of the cord are passed through passageways 38 in housing 30, which extend into the interior of the housing, and are wound upon the two winding sections of shaft 32. It will be appreciate that if both ends of the cord 24 are wound upon the shaft 32 in the same direction, then by rotating the winding cylinder 36 and hence the shaft 32, both ends of the cord 24 will be drawn into the spool and will thereby simultaneously draw the four corner blocks together and maintain an object held therein under compression, the degree of which can be regulated by winding the cord 24 to any desired tension.

Figure 4:
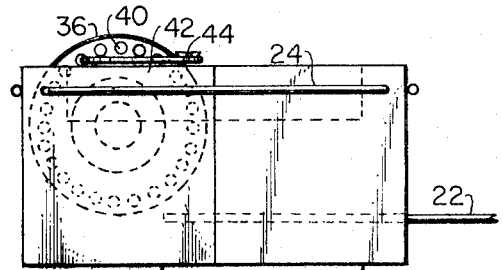
FIG. 4 is a left side elevational view showing the registry recesses or holes in the winding spool.

Cooperating means are provided between the housing 30 and the winding cylinder 36 to lock the cylinder 36 and hence winding spool 28 against undesired rotation. As seen in FIGS. 3 and 4, the winding cylinder 36 is of such diameter as to extend somewhat above the top of housing 30. Drilled in the circular surface of the cylinder facing housing 30, and adjacent the periphery thereof, are a number of recesses or holes 40 which are circumferentially spaced and extend into the cylinder a short distance sufficient to receive a locking pin 42. The pin 42, in its preferred embodiment, is hooklike in configuration, and may advantageously comprise a conventional door hook. This hook preferably is pivotably secured to the top surface of spool housing 30 about screw 44 so as to pivot generally parallel to the top surface of the housing. It will be seen from FIG. 4 that as the winding cylinder 36 is rotated to tighten the cord 24, pin 42 may be pivoted to enter any one of the holes 40 and thereby lock the cylinder 36 against additional rotation or unwinding thus maintaining the cord 24 at any desired degree of tension. Due to the hooklike configuration of member 42, the hook will tend to seat itself in the hole 40 under rotational tension of the cylinder 36 and will thus resist accidental displacement from the hole.

Figure 7:
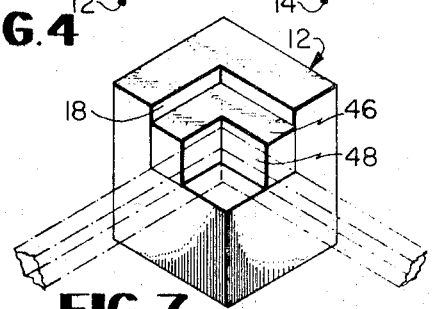

As will be appreciate, when the clamp is empty and the cord 24 is tightened, corner blocks 10, 12, 14 and 16 will be drawn together until they abut each other; further tightening of the cord will merely increase the tension on the cord. It is clear, therefore, that without further modification, the smallest dimension of a picture frame which can be held by the clamp is equal to the combined lengths of two adjacent vertical wall sections 18, i.e., the minimum possible dimension across the interior recess between opposing walls 18. FIGS. 6 and 7 show means by which frames smaller than this minimum size may advantageously be clamped. An insert member 46 is provided for each of the corner blocks, each insert preferably being L-shaped and having an outer length and width substantially equal to the length of a vertical wall 18, and a height approximately equal to the height of the vertical wall 18. The inside vertical walls 48 of the L-shaped insert member 46 may be of any suitable length smaller than that of one of the walls 18, but should provide sufficient area to support the sides of a frame in the same manner as walls 18. It will be noted that inasmuch as the inset members 46, in effect move vertical walls 18 inwardly, a much smaller frame can be clamped through use of these insert members than through the use of the corner blocks alone.

Operation the clamp should be evident from the above description of its structure. Glue or cement or other securing means is first applied to the four sides of a picture frame at their mitred ends. The sides are then inserted into the open clamp, and winding cylinder 36 is then rotated to draw the corner blocks 10, 12, 14 and 16 together. As this is done, the blocks will adjust themselves to the particular proportions of the rectangular frame being assembled, by virtue of the fact that the blocks are individually free for movement along guide rods 22 in one direction and the rods themselves are free to move closer together or apart in the other direction of a two-dimensional system. When the clamp has contracted in size to the dimensions of the frame, the cylinder 36 may be further rotated to place the cord 24 under any desired degree of tension and hence place any desired degree of compression on the frame. The locking hook member 42 is then pivoted to engage one of the holes 40 in cylinder 36 to lock the cylinder against rotation and prevent inadvertent loosening of the clamp. When it is desired to open the clamp, hook member 42 is pivoted out of the hole 40, and the tension on both ends of cord 24 will tend to unwind cylinder 36, or it can be unwound by hand, thus relieving the compression forces on the corner blocks and permitting removal of the finished frame.

It will be appreciated that by virtue of the novel described construction, the inventive clamp is capable of use over a wide range of size adjustments. Without the provision of insert members 46, the minimum size frame that can be clamped is limited to the distance across the interior recess of the closed clamp between vertical walls 18. Yet, still smaller frames can be clamped with the L-shaped insert members 46 of the invention, and thus, essentially no lower limit need be imposed on the size of the frame that can be effectively clamped. At the other extreme, the maximum size of frame that can be clamped is limited only by the length of cord available, and by the length of rods 22.

While all four corner blocks are free for movement relative to each other, subject to the tightening or loosening of cord 24, blocks 10 and 16 are maintained in proper aligned orientation relative to each other, by reason of the sliding fit upon rod 22, as are blocks 12 and 14. In the slackened state of the clamp, this alignment facilitates proper insertion of the components of a picture frame since the corner blocks of the clamp will tend to assume a rectangular configuration even with the cord 24 slackened. When the clamp is tightened about a frame, these rods define a directional axis along which the blocks of each pair can be displaced and thus aid in maintaining the blocks of each pair in proper alignment and effectively prevent the possibility of the clamp folding vertically upon itself as the result of too great tension on the cord 24.

It should now be apparent from the foregoing description of a preferred inventive embodiment that all the objects set forth at the outset of this specification have been successfully achieved.

What is claimed is:

1. A clamp for securing the sides of a rectangular frame or the like in assembled relationship comprising:
    a plurality of four individual corner blocks, each block being recessed to grip one corner of a rectangular frame;
    a plurality of elongate guide members extending in general parallelism with each other from respective adjacent blocks to and slidably through opposite respective adjacent blocks to constrain the blocks of each opposite pair to movement toward and away from each other, said pairs of opposite blocks being unconstrained relative to each other;
    a flexible member extending about all of said plurality of blocks; and
    means secured to one of said blocks to tighten the said flexible member, thereby displacing the blocks of each opposed pair along the direction of constraint and displacing said pairs of opposed blocks toward one another in a direction transverse to direction of constraint so as to draw all of said blocks together and clamp the rectangular frame therebetween.

2. A clamp as defined in claim 1, wherein said tightening means comprises a rotatable cylindrical spool and a fixed housing for said spool disposed on one of said blocks, said flexible member being wound upon said spool, whereby rotation of said spool causes said flexible member to be further wound thereupon to draw said blocks together.

3. A clamp as defined in claim 2, further comprising locking means to lock said rotatable spool against rotation.

4. A clamp as defined in claim 3, wherein said locking means comprises a series of holes circumferentially spaced about the periphery of said cylindrical spool and a hook member secured to said housing and selectively pivotable to engage one of said holes to lock said spool against rotation.

5. A clamp as defined in claim 3, wherein said guide members comprise rods, each of said rods being secured to one of the blocks of its respective pair with the other block of said pair slidably mounted thereupon.

6. A clamp as defined in claim 1, in combination with removable insert means for each recessed portion for reducing the effective dimension of each recessed portion.